US012407994B2

(12) United States Patent
Haagerup et al.

(10) Patent No.: US 12,407,994 B2
(45) **Date of Patent: *Sep. 2, 2025**

(54) HEARING AID FOR PLACEMENT AT AN EAR OF A USER

(71) Applicant: Oticon Medical A/S, Smørum (DK)

(72) Inventors: Emilie Munk Haagerup, Smørum (DK); Peder Hesselbjerg Pedersen, København N (DK); Mads Buur Mortensen, Smørum (DK); Johan Rosengren, Smørum (DK)

(73) Assignee: Oticon Medical A/S, Smørum (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/441,113

(22) Filed: Feb. 14, 2024

(65) Prior Publication Data

US 2024/0305938 A1 Sep. 12, 2024

Related U.S. Application Data

(60) Continuation of application No. 17/553,277, filed on Dec. 16, 2021, now Pat. No. 11,937,050, which is a (Continued)

(30) Foreign Application Priority Data

May 15, 2017 (EP) .................................... 17171091

(51) Int. Cl.
*H04R 25/00* (2006.01)

(52) U.S. Cl.
CPC ......... *H04R 25/606* (2013.01); *H04R 25/554* (2013.01); *H04R 25/60* (2013.01); *H04R 2225/51* (2013.01); *H04R 2225/67* (2013.01)

(58) Field of Classification Search
None
See application file for complete search history.

(56) References Cited

U.S. PATENT DOCUMENTS

| | | | |
|---|---|---|---|
| 6,358,281 | B1 | 3/2002 | Berrang et al. |
| 9,545,522 | B2 | 1/2017 | Gibson et al. |

(Continued)

FOREIGN PATENT DOCUMENTS

| | | |
|---|---|---|
| CN | 104640043 A | 5/2015 |
| EP | 1 624 720 A2 | 2/2006 |

(Continued)

OTHER PUBLICATIONS

"Kanso ™ Sound Processor User Guide," 2016, retrieved from <<https://cochlearimplanthelp.files.wordpress.com/2016/09/cochlear-kanso-user-guide.pdf>>.

(Continued)

*Primary Examiner* — Qin Zhu
(74) *Attorney, Agent, or Firm* — Birch, Stewart, Kolasch & Birch, LLP

(57) ABSTRACT

This disclosure relates to a hearing aid for placement on head of a user comprising a first second part. The first part may comprise an acoustic input transducer adapted to convert ambient sound picked up at the ear of the user to an electric signal, a signal processor adapted to process the electric signal according to specifications of user into a processed electric signal, and an output transducer adapted to covert the processed electric signal into a transmission signal, The second part may comprise an anchor adapted to fixate said second part under the skin to skull bone of the user, and a receiver adapted to receive the transmission signal and convert the transmission signal to an output signal perceivable as sound by the user. The first part may comprise an inner recess adapted to receive an insert element, where the insert element may comprise a first magnet adapted to in (Continued)

cooperation with the second part to cause the first part to attach to the head of the user.

14 Claims, 5 Drawing Sheets

Related U.S. Application Data division of application No. 16/995,231, filed on Aug. 17, 2020, now Pat. No. 11,323,831, which is a division of application No. 16/683,013, filed on Nov. 13, 2019, now Pat. No. 10,848,884, which is a division of application No. 15/980,074, filed on May 15, 2018, now Pat. No. 10,516,954.

(56) References Cited

U.S. PATENT DOCUMENTS

| | | | | |
|---|---|---|---|---|
| 2006/0116743 | A1* | 6/2006 | Gibson | A61N 1/36036 607/57 |
| 2007/0191673 | A1 | 8/2007 | Ball et al. | |
| 2009/0209806 | A1 | 8/2009 | Hakansson | |
| 2009/0253951 | A1 | 10/2009 | Ball et al. | |
| 2011/0071339 | A1 | 3/2011 | Rosenbum | |
| 2013/0004003 | A1 | 1/2013 | Tada | |
| 2013/0018218 | A1 | 1/2013 | Haller et al. | |
| 2014/0233765 | A1 | 8/2014 | Andersson et al. | |
| 2015/0124976 | A1 | 5/2015 | Pedersen et al. | |
| 2015/0208183 | A1 | 7/2015 | Bern | |
| 2015/0281860 | A1* | 10/2015 | Johansson | H04R 25/606 381/326 |
| 2016/0094922 | A1 | 3/2016 | Ollgaard et al. | |
| 2016/0100260 | A1 | 4/2016 | Ruppersberg et al. | |
| 2016/0219383 | A1 | 7/2016 | Ridler et al. | |
| 2017/0094399 | A1 | 3/2017 | Chandramohan et al. | |
| 2017/0180891 | A1 | 6/2017 | Johansson | |
| 2018/0035219 | A1 | 2/2018 | Gustafsson | |
| 2018/0146308 | A1 | 5/2018 | Leigh et al. | |
| 2018/0160241 | A1 | 6/2018 | Gustafsson et al. | |

FOREIGN PATENT DOCUMENTS

| | | | |
|---|---|---|---|
| EP | 1 624 720 | A3 | 2/2006 |
| EP | 2 871 857 | A1 | 5/2015 |
| EP | 3 103 511 | A1 | 12/2016 |
| WO | WO 2004/030572 | A2 | 4/2004 |
| WO | WO 2007/103325 | A2 | 9/2007 |
| WO | WO 2010/105601 | A3 | 9/2010 |
| WO | WO 2013/021380 | A1 | 2/2013 |
| WO | WO 2013/091562 | A1 | 6/2013 |
| WO | WO 2016/207856 | A1 | 12/2016 |
| WO | WO 2017/027045 | A1 | 2/2017 |

OTHER PUBLICATIONS

Dave Catlett, “Cochlear Clinical Quick Tip: Optimizing Your Kanso® Fittings,” Cochlear Implants by Cochlear Guest Author; Jun. 28, 2017; retrieved from <<https://pronews.cochlearamericas.com/cochlear-clinical-quick-tip-optimizing-your-kanso-fittings/>>.

Screenshots from YouTube video entitled “How the CochlearTM Nucleus® Kanso TM Implant System Works,” available at <<https://www.youtube.com/watch?app=desktop&v=v8Ex3usN2rl>>, posted Sep. 6, 2016.

* cited by examiner

HEARING AID FOR PLACEMENT AT AN EAR OF A USER

CROSS-REFERENCE TO RELATED APPLICATIONS

This application is a Continuation of copending application Ser. No. 17/553,277, filed Dec. 16, 2021, which is a Divisional of application Ser. No. 16/995,231, filed Aug. 17, 2020 (now U.S. Pat. No. 11,323,831 issued May 3, 2022) which is a Divisional of application Ser. No. 16/683,013, filed on Nov. 13, 2019 (now U.S. Pat. No. 10,848,884 issued Nov. 24, 2020), which is a Divisional of application Ser. No. 15/980,074, filed on May 15, 2018 (now U.S. Pat. No. 10,516,954 issued on Dec. 24, 2019), which claims priority under 35 U.S.C. § 119(a) to application Ser. No. 17/171,091.6, filed in Europe on May 15, 2017, all of which are hereby expressly incorporated by reference into the present application.

BACKGROUND

This disclosure generally relates to hearing aids and hearing aid systems for compensation of hearing impairment of a user. Hearing aids and hearing aid systems may utilize a variety of transducers for converting ambient sound to a signal perceivable by the user as sound.

For example, hearing aids and hearing aid systems may include output transducers such as loudspeakers (sometimes referred to as receivers within the hearing aid business), which loudspeakers convert a processed version of the ambient sound to an acoustic signal hearable to the user. The processed version of the ambient sound is communicated to the ear canal of the user causing the user's tympanic member picking up the processed sound.

Other hearing aids and hearing aid systems may include output transducers such as electrodes (cochlea implants), which are implanted into the user's cochlea and which convert a processed and coded version of the ambient sound to an electric signal stimulating hair cells of the cochlea.

Still other hearing aids and hearing aid systems may include output transducers such as vibrators, which may be anchored to a user's skull bone by means of an implant and which convert a processed version of the ambient sound to a mechanical vibration stimulating the cochlea through mechanical vibrations communicated through the skull bone to the cochlea.

SUMMARY

In an aspect of the present disclosure, a hearing aid for placement on head of a user comprising: a first part comprising:

- an acoustic input transducer adapted to convert ambient sound picked up at the ear of the user to an electric signal,
- a signal processor adapted to process the electric signal according to specifications of user into a processed electric signal, and
- an output transducer adapted to covert the processed electric signal into a transmission signal, and a second part comprising:

- an anchor adapted to fixate said second part under the skin to skull bone of the user, and
- a receiver adapted to receive the transmission signal and convert the transmission signal to an output signal perceivable as sound by the user, and wherein said first part further comprising an inner recess adapted to receive an insert element, said insert element comprising a first magnet adapted to in cooperation with said second part to cause said first part to attach to the head of the user.

In this aspect of the present disclosure the first part may be adapted to be located on an external skin surface covering part of a skull bone of the user. In this context, the term "external" is to be construed as something not implanted. For example, the first part may comprise an acoustic input transducer such as a microphone or dedicated audio transfer means e.g. telecoil or radiofrequency (RF) receiver adapted to receive wireless signals from hearing aid accessories. Further, the first part may comprise a signal processor adapted for processing a signal converted by an acoustic input transducer. Such signal processor may be a digital signal processor operating per a selected program, which may be coded in software stored in associated memory. The processed signal may be processed in accordance with a user's specifications as to frequency and level. For example, the specifications may be obtained through an audiogram or similar determinations of a user's hearing capability or may be established through a user's interaction with the first part, a remote controller or a mobile phone enabling control of the hearing aid. The first part may further comprise an output transducer adapted for converting processed signal from the signal processor to a transmission signal. A transmission signal may in this context be construed as a signal, which may be used for converting into a hearable signal to the user.

In this aspect of the present disclosure the first part of the hearing aid may further comprise an inner recess or available space for the insertion of an insert element. The insert element may carry a first magnet, which in cooperation with the second part anchored to skull bone of a user may be used for attaching to the first part to the user's head. By using the first magnet for attaching the first part to the skull bone advantageously provides positioning of the housing for optimal transmission of the transmission signal to receiver in second part. Hence contrary to known hearing aids the first part including transducers and processor is maintained at a location on the head of the user by means of a magnetic force between the first and second parts. This may allow for placement of hearing aid in a position that may be less visible to other parties.

In an aspect of the present disclosure the insert element may define an cross-sectional outer shape substantially matching cross-sectional shape of inner recess. For example, the insert element may define a circular cross-sectional shape having a diameter just small enough to allow for insertion into the inner recess. The inner recess may have a shape with a cross-sectional shape having either a circular, square, elliptical or multi-sided cross-sectional shape wherein the dimensions are slightly greater than the diameter of the insert element's cross-sectional shape. The insert element may have cross-sectional shape substantially matching the shape of the inner recess so that the utilization of volume of the housing is optimized. The matching of shapes of insert element and inner recess allows for substitution of an insert element having a particular magnetic strength with another insert element having another magnetic strength without complicating the mechanical set-up of the housing.

In an aspect of the present disclosure the first magnet of the insert element may have a magnetic strength caused by physical size of the first magnet as well as caused by magnetic material. The magnetic material may be neodymium (also known as NdFEB, NIB or Neo) but may also be Ferrite ($Fe_2O_3$), Rare-earth alloys, or Cobolt alloys (AlNiCoFe or SmCo). The relative size of the first magnet in the insert element may be between 1 and 0.1, i.e. the first magnet may take up the full volume of the insert element or may take up only part of the volume.

In an aspect of the present disclosure the insert element may further comprise a non-magnetic space. In this context non-magnetic is to be construed as a material having a relative permeability close to one such as air, plastic, cobber, aluminum, platinum or wood. For example, the first magnet may be defined by the outer periphery cross-sectional shape of the insert element, while the insert element may have a non-magnetic space centered in the insert element. Thus the magnetic strength of the insert element may be varied by varying the size of the non-magnetic space in the insert element. In the alternative, the first magnet may have a longitudinal length only part of the overall longitudinal length of the insert element. In this context the insert element may have a non-magnetic space taking up the rest of the overall longitudinal length. In a further alternative, the first magnet may have a longitudinal length equal to the overall longitudinal length of the insert element, while the first magnet is centered along the longitudinal length of the insert element. In this context the insert element may have a non-magnetic space taking up the rest of the insert element. Hence the available overall volume of the insert element may be occupied by a non-magnetic space to ensure a flexibility in selecting an insert element from a range of insert elements having a variety of magnetic strengths ensuring attachment of the housing to the user's head, while maintaining a single outer shape of the insert element thereby providing a general fixation of the insert element in the inner recess of the housing. The variability of the magnetic strength of the insert element may provide the user of the possibility to selecting a magnetic strength of the insert element that provides a comfortable attachment of the first part to the user's head.

In an aspect of the present disclosure the non-magnetic space may be established by an opening, which may extend along the longitudinal length of the insert element or only partly thereof. The opening may be a carve-out, groove, and/or slit in the magnetic material along the longitudinal length of the first magnet or may, in fact, be a "carve out" of magnet material in a direction transverse to the longitudinal length of the first magnet. The "carve out" may be provided along the longitudinal axis of the first magnet or shifted in any radial direction therefrom or/and may have any shape such as a cylindrical shape having a square, circular, epileptic or multi-sided shaped cross-section. It is particular advantageous that the outer perimeter of the insert element comprising the first magnet and non-magnetic space (which could be air) is maintained in a fixed shape. For example, the by varying the size of an opening in the first magnet may provide for a variety of magnetic strengths while maintaining a good fit of the insert element in inner recess.

In an aspect of the present disclosure the first part may further comprise a skin-engaging surface with friction elements, which may comprise a plurality of protruding dots. The protruding dots may ensure friction between the first part and the skin on the head of the user thereby maintaining the first part in a correct position on the head of the user. This may further allow for reduction of magnetic strength required by the first magnet, which in turn may be achieved by increasing the non-magnetic space (air) reducing the overall weight of the insert. This removal or replacement will cause the magnet configuration in the first part to make the first part, as a whole, lighter.

In an aspect of the present disclosure the friction elements may be located substantially on circumference of skin-engaging surface. The protruding dots may be spread on the skin-engaging surface forming a wide variety of shapes such as co-centric circles and/or squares or such as radiating lines of protruding dots from the center of the skin-engaging surface.

In an aspect of the present disclosure, the insert element may be fixated to the inner recess of the first part by a lid. The first part may further comprise a cover system facing away from the user and possibly opposite to the skin-engaging surface. This cover system may comprise a first section adapted to cover the lid fixating the insert element, a second section adapted to cover a battery of the housing, and wherein the first and second sections are locking on to the first part and with one another.

In an aspect of the present disclosure the second part may comprise casing of a magnetic or paramagnetic material. Alternatively or additionally, the second part may comprise a second magnet positioned in the casing adapted for providing an attractive force between the first and second parts.

In an aspect of the present disclosure the second part may be located in a recess in skull bone of the user, preferably in a recess of the temporal bone, more preferably a recess of the mastoid part of temporal bone. The recess in the skull bone may be made by a surgeon by milling bone matter away to accurately enable the insertion or anchoring of the second part in the recess. Alternatively, the implant may be anchored directly onto the skull bone of the user without making a recess into the skull bone.

In an aspect of the present disclosure the output transducer may comprise a transmission coil adapted to inductively communicate the transmission signal to the receiver in the second part, which may comprise a reception coil. The second part may be adapted to receive the transmission signal and to covert the transmission signal to an output signal, which may be perceived as sound by the user.

In an aspect of the present disclosure the second part may further comprise a second signal processor adapted to perform further processing or coding of the received transmission signal and to provide a second processed signal to be converted into the output signal.

In an aspect of the present disclosure the second part may further comprise an electrode adapted to insert in a cochlea of the user and to receive and covert the output signal to electric stimulae of the cochlea. In addition or alternatively the second part may further comprise a vibrator adapted to engage with the skull bone of user so as to vibrate the skull bone and adapted to receive and covert the output signal to mechanical vibrations to be picked up by the cochlea of the user.

In an aspect of the present disclosure the first part may further comprise an antenna adapted to receive and transmit wireless signals from and to a second hearing aid or an accessory device for said hearing aid or said second hearing aid. The wireless signal may comprise at least in part an audio signal, and the audio signal may be mixed into the transmission signal. The wireless signal may comprise a carrier frequency selected from the ranges consisting of: 1 to 10 GHZ, 2 to 9 GHZ or 3 to 8 GHz, and/or ranges consisting of 1 to 3 GHZ, 3 to 6 GHz or 6 to 10 GHz. The hearing aid may incorporate Bluetooth compatible software and hardware to significantly improve the user's utilization and access to other electronic devices (accessories) such as television, landline telephone (PSTN), mobile phone and/or external microphones.

In an aspect of the present disclosure the second part may be located at a non-functional car of the user, and the second part may convert the transmission signal to an output signal, which may be communicated to the other car of the user i.e. the healthier car. This solution is advantageous to situations where the user suffers from single sided deafness, where one of the user's ears is not functional. Therefore the solution advantageously assists a user with such impairment by picking up the sound at the non-functional car and making processed sound available to working car on the other side of the user's head. Communication of the output signal from one side of the user's head to the other may be accomplished by inducing mechanical vibrations in the skull bone on the side of the non-functional car, which vibrations are carried by the skull bone to the working car on the other side of the user's head. Alternatively, communication of the output signal may be accomplished by transmitting the output signal in the form of magnetic inductive signal to a mechanical vibrator placed on the side of the user with a functional car and having a reception coil adapted to receive the magnetic inductive signal, and the mechanical vibrator converting the received inductive signal to mechanical vibrations to be perceived by the user as sound. Further additionally or alternatively, the communication of the output signal may be accomplished by transmitting the output signal in the form of an RF signal to a mechanical vibrator placed on the side of the user with a healthy car and having an antenna adapted to receive the RF-signal, and the mechanical vibrator converting the received RF-signal to mechanical vibrations.

In an aspect of the present disclosure the communication of the output signal may be accomplished by transmitting the output signal in the form of magnetic inductive signal from the second part to a third part (possibly implanted) placed on the side of the user with a functional car and having a reception coil adapted to receive the magnetic inductive signal, and the third part may convert the received inductive signal to a cochlea electrode driving signal to be heard by the user. Further alternatively, the communication of the output signal from the second part may be accomplished by transmitting the output signal in the form of an RF-signal to the third part (possibly implanted) placed on the side of the user with a functional car and having an antenna adapted to receive the RF-signal, and the third part converting the received RF-signal to a cochlea electrode driving signal.

It is a particular important and complicated element of hearing aid design to ensure that hearing aids are small while ensuring great versatility in performance, which requires significant processing power as well as battery capacity.

In an embodiment, the hearing aid is adapted to provide a frequency dependent gain and/or a level dependent compression and/or a transposition (with or without frequency compression) of one or more frequency ranges to one or more other frequency ranges, e.g. to compensate for a hearing impairment of a user. In an embodiment, the hearing device comprises a signal processor for enhancing the ambient signals and providing a processed output signal.

In an embodiment, the hearing aid comprises an implant for providing a stimulus perceived by the user as an acoustic signal based on a processed electric signal. In an embodiment, the output unit comprises a number of electrodes of a cochlea implant or a vibrator of a bone conducting hearing device. In an embodiment, the implant comprises an implant transducer. In an embodiment, the implant transducer comprises a vibrator for providing the stimulus as mechanical vibration of a skull bone to the user (e.g. in a bone-attached or bone-anchored hearing aid, which may be configured as percutaneous and/or transcutaneous).

In an embodiment, the hearing aid comprises an input transducer for providing an electric input signal representing sound. In an embodiment, the input transducer comprises a microphone for converting an input sound to an electric input signal. In an embodiment, the input transducer comprises a wireless receiver for receiving a wireless signal comprising sound and for providing an electric input signal representing said sound.

In an embodiment, the hearing device comprises a directional microphone system adapted to spatially filter sounds from the environment, and thereby enhance a target acoustic source among a multitude of acoustic sources in the local environment of the user wearing the hearing aid. In an embodiment, the directional system is adapted to detect (such as adaptively detect) from which direction a particular part of the microphone signal originates. This can be achieved in various different ways as e.g. described in the prior art. In hearing aid, a microphone array beamformer is often used for spatially attenuating background noise sources. Many beamformer variants can be found in literature, see, e.g., [Brandstein & Ward; 2001] and the references therein. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

In an embodiment, the hearing aid comprises an antenna and transceiver circuitry (e.g. a wireless receiver) for wirelessly receiving a direct electric input signal from another device, e.g. from an entertainment device (e.g. a TV-set), a communication device, a wireless microphone, or another hearing aid. In an embodiment, the direct electric input signal represents or comprises an audio signal and/or a control signal and/or an information signal. In an embodiment, the hearing aid comprises demodulation circuitry for demodulating the received direct electric input to provide the direct electric input signal representing an audio signal and/or a control signal e.g. for setting an operational parameter (e.g. volume) and/or a processing parameter of the hearing device. In general, a wireless link established by antenna and transceiver circuitry of the hearing aid may be of any type. In an embodiment, the wireless link is established between two devices, e.g. between an entertainment device (e.g. a TV) and the hearing aid, or between two hearing aids, e.g. via a third, intermediate device (e.g. a processing device, such as a remote control device, a mobile phone, smartphone, etc.). In an embodiment, the wireless link is used under power constraints, e.g. in that the hearing device is or comprises a portable (typically battery driven) device. In an embodiment, the wireless link is a link based on near-field communication, e.g. an inductive link based on an inductive coupling between antenna coils of transmitter and receiver parts. In another embodiment, the wireless link is based on far-field, electromagnetic radiation. In an embodiment, the communication via the wireless link is arranged according to a specific modulation scheme, e.g. an analogue modulation scheme, such as FM (frequency modulation) or AM (amplitude modulation) or PM (phase modulation), or a digital modulation scheme, such as ASK (amplitude shift keying), e.g. On-Off keying, FSK (frequency shift keying), PSK (phase shift keying), e.g. MSK (minimum shift keying), or QAM (quadrature amplitude modulation), etc.

In an embodiment, the communication between the hearing aid and the other device is in the base band (audio frequency range, e.g. between 0 and 20 kHz). Preferably, communication between the hearing aid and the other device is based on some sort of modulation at frequencies above 100 kHz. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). In an embodiment, the wireless link is based on a standardized or proprietary technology. In an embodiment, the wireless link is based on Bluetooth technology (e.g. Bluetooth Low-Energy technology).

In an embodiment, the hearing aid and/or the communication device comprises an electrically small antenna. An 'electrically small antenna' is in the present context taken to mean that the spatial extension of the antenna (e.g. the maximum physical dimension in any direction) is much smaller than the wavelength $\lambda_{Tx}$ of the transmitted electric signal. In an embodiment, the spatial extension of the antenna is a factor of 10, or 50 or 100 or more, or a factor of 1 000 or more, smaller than the carrier wavelength $\lambda_{Tx}$ of the transmitted signal. In an embodiment, the hearing aid is a relatively small device. The term 'a relatively small device' is in the present context taken to mean a device whose maximum physical dimension (and thus of an antenna for providing a wireless interface to the device) is smaller than 10 cm, such as smaller than 5 cm. In an embodiment 'a relatively small device' is a device whose maximum physical dimension is much smaller (e.g. more than 3 times, such as more than 10 times smaller, such as more than 20 times small) than the operating wavelength of a wireless interface to which the antenna is intended (ideally an antenna for radiation of electromagnetic waves at a given frequency should be larger than or equal to half the wavelength of the radiated waves at that frequency). At 860 MHZ, the wavelength in vacuum is around 35 cm. At 2.4 GHz, the wavelength in vacuum is around 12 cm. In an embodiment, the hearing aid has a maximum outer dimension of the order of 0.15 m (e.g. a handheld mobile phone). In an embodiment, the housing of the hearing aid has a maximum outer dimension of the order of 0.04 m.

In an embodiment, the hearing aid is a portable device, e.g. a device comprising a local energy source, e.g. a battery, e.g. a rechargeable battery.

In an embodiment, the hearing aid comprises a forward or signal path between an input transducer, such as a microphone or a microphone system and/or direct electric input (e.g. a wireless receiver)) and an output transducer. In an embodiment, the signal processor is located in the forward path. In an embodiment, the signal processor is adapted to provide a frequency dependent gain according to a user's particular needs. In an embodiment, the hearing device comprises an analysis path comprising functional components for analyzing the input signal (e.g. determining a level, a modulation, a type of signal, an acoustic feedback estimate, etc.). In an embodiment, some or all signal processing of the analysis path and/or the signal path is conducted in the frequency domain. In an embodiment, some or all signal processing of the analysis path and/or the signal path is conducted in the time domain.

In an embodiment, an analogue electric signal representing an acoustic signal is converted to a digital audio signal in an analogue-to-digital (AD) conversion process, where the analogue signal is sampled with a predefined sampling frequency or rate fs, fs being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using No bits (resulting in $2^{Nb}$ different possible values of the audio sample). A digital sample x has a length in time of 1/fs, e.g. 50 μs, for $f_s$=20 kHz. In an embodiment, a number of audio samples are arranged in a time frame. In an embodiment, a time frame comprises 64 or 128 audio data samples. Other frame lengths may be used depending on the practical application.

In an embodiment, the hearing aid comprises an analogue-to-digital (AD) converter to digitize an analogue input (e.g. from an input transducer, such as a microphone) with a predefined sampling rate, e.g. 20 kHz. In an embodiment, the hearing devices comprise a digital-to-analogue (DA) converter to convert a digital signal to a transmission signal, e.g. for being communicated to an implant presented to a user via an implant transducer.

In an embodiment, the hearing aid comprises a TF-conversion unit for providing a time-frequency representation of an input signal. In an embodiment, the time-frequency representation comprises an array or map of corresponding complex or real values of the signal in question in a particular time and frequency range. In an embodiment, the TF conversion unit comprises a filter bank for filtering a (time varying) input signal and providing a number of (time varying) output signals each comprising a distinct frequency range of the input signal. In an embodiment, the TF conversion unit comprises a Fourier transformation unit for converting a time variant input signal to a (time variant) signal in the (time-)frequency domain. In an embodiment, the frequency range considered by the hearing device from a minimum frequency $f_{min}$ to a maximum frequency $f_{max}$ comprises a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. In an embodiment, a signal of the forward and/or analysis path of the hearing device is split into a number NI of frequency bands (e.g. of uniform width), where NI is e.g. larger than 5, such as larger than 10, such as larger than 50, such as larger than 100, such as larger than 500, at least some of which are processed individually. In an embodiment, the hearing device is/are adapted to process a signal of the forward and/or analysis path in a number NP of different frequency channels (NP≤NI). The frequency channels may be uniform or non-uniform in width (e.g. increasing in width with frequency), overlapping or non-overlapping.

In an embodiment, the hearing aid comprises a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively or additionally, one or more detectors may form part of an external device in communication (e.g. wirelessly) with the hearing aid. An external device may e.g. comprise another hearing aid, a remote control, and audio delivery device, a telephone (e.g. a mobile phone or Smartphone), an external sensor, etc.

In an embodiment, one or more of the number of detectors operate(s) on the full band signal (time domain). In an embodiment, one or more of the number of detectors operate (s) on band split signals ((time-) frequency domain), e.g. in a limited number of frequency bands.

In an embodiment, the number of detectors comprises a level detector for estimating a current level of a signal of the forward path. In an embodiment, the predefined criterion comprises whether the current level of a signal of the forward path is above or below a given (L-) threshold value. In an embodiment, the level detector operates on the full band signal (time domain). In an embodiment, the level detector operates on band split signals ((time-) frequency domain).

In a particular embodiment, the hearing aid comprises a voice detector (VD) for estimating whether or not (or with what probability) an input signal comprises a voice signal (at a given point in time). A voice signal is in the present context taken to include a speech signal from a human being. It may also include other forms of utterances generated by the human speech system (e.g. singing). In an embodiment, the voice detector unit is adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). In an embodiment, the voice detector is adapted to detect as a VOICE also the user's own voice. Alternatively, the voice detector is adapted to exclude a user's own voice from the detection of a VOICE.

In an embodiment, the hearing aid comprises an own voice detector for estimating whether or not (or with what probability) a given input sound (e.g. a voice, e.g. speech) originates from the voice of the user of the system. In an embodiment, a microphone system of the hearing aid is adapted to be able to differentiate between a user's own voice and another person's voice and possibly from NON-voice sounds.

In an embodiment, the number of detectors comprises a movement detector, e.g. an acceleration sensor. In an embodiment, the movement detector is configured to detect movement of the user's facial muscles and/or bones, e.g. due to speech or chewing (e.g. jaw movement) and to provide a detector signal indicative thereof.

In an embodiment, the hearing aid comprises a classification unit configured to classify the current situation based on input signals from (at least some of) the detectors, and possibly other inputs as well. In the present context 'a current situation' is taken to be defined by one or more of a) the physical environment (e.g. including the current electromagnetic environment, e.g. the occurrence of electromagnetic signals (e.g. comprising audio and/or control signals) intended or not intended for reception by the hearing device, or other properties of the current environment than acoustic);
b) the current acoustic situation (input level, feedback, etc.), and
c) the current mode or state of the user (movement, temperature, cognitive load, etc.);
d) the current mode or state of the hearing device (program selected, time elapsed since last user interaction, etc.) and/or of another device in communication with the hearing device.

In an embodiment, the hearing aid comprises an acoustic (and/or mechanical) feedback suppression system. Acoustic feedback occurs because the implant output when provided by a mechanical vibrator is returned to the microphone via an acoustic and/or mechanical coupling through the air or other media. The part of the returned signal to the microphone is then re-amplified by the system before it is re-presented at the implant output, and again returned to the microphone. As this cycle continues, the effect of acoustic feedback becomes audible as artifacts or even worse, howling, when the system becomes unstable. The problem appears typically when the microphone and the mechanical vibrator are placed closely together. Some other classic situations with feedback problem are telephony, public address systems, headsets, audio conference systems, etc. Adaptive feedback cancellation has the ability to track feedback path changes over time. It is based on a linear time invariant filter to estimate the feedback path but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal. Various aspects of adaptive filters are e.g. described in [Haykin].

In an embodiment, the feedback suppression system comprises a feedback estimation unit for providing a feedback signal representative of an estimate of the acoustic and/or mechanical feedback path, and a combination unit, e.g. a subtraction unit, for subtracting the feedback signal from a signal of the forward path (e.g. as picked up by an input transducer of the hearing device). In an embodiment, the feedback estimation unit comprises an update part comprising an adaptive algorithm and a variable filter part for filtering an input signal according to variable filter coefficients determined by said adaptive algorithm, wherein the update part is configured to update said filter coefficients of the variable filter part with a configurable update frequency $f_{upd}$. In an embodiment, the hearing device is configured to provide that the configurable update frequency $f_{upd}$ has a maximum value $f_{upd,max}$. In an embodiment, the maximum value $f_{upd,max}$ is a fraction of a sampling frequency $f_s$ of an AD converter of the hearing device ($f_{upd,max}$=f/D). In an embodiment, the configurable update frequency $f_{upd}$ has its maximum value $f_{upd,max}$ in an ON-mode of operation of the anti-feedback system (e.g. the maximum power mode). In an embodiment, the hearing aid is configured to provide that—in a mode of operation of the anti-feedback system other than the maximum power ON-mode—the update frequency of the update part is scaled down by a predefined factor X compared to said maximum update frequency $f_{upd,max}$. In an embodiment, the update frequency $f_{upd}$ in different ON-modes of operation (other than the maximum power ON-mode) is scaled down with different factors $X_i$, i=1, . . . , ($N_{ON}$−1), where $N_{ON}$ is the number of ON-modes of operation of the anti-feedback system.

The update part of the adaptive filter comprises an adaptive algorithm for calculating updated filter coefficients for being transferred to the variable filter part of the adaptive filter. The timing of calculation and/or transfer of updated filter coefficients from the update part to the variable filter part may be controlled by the activation control unit. The timing of the update (e.g. its specific point in time, and/or its update frequency) may preferably be influenced by various properties of the signal of the forward path. The update control scheme is preferably supported by one or more detectors of the hearing device, preferably included in a predefined criterion comprising the detector signals. In an embodiment, the hearing aid further comprises other relevant functionality for the application in question, e.g. compression, noise reduction, etc.

A Hearing Aid System:

In a further aspect, a hearing system comprising a hearing device as described above, in the 'detailed description of embodiments', and in the claims, AND an auxiliary device is moreover provided.

In an embodiment, the hearing aid system is adapted to establish a communication link between the hearing aid and the auxiliary device and/or a second hearing aid to provide that information (e.g. control and status signals, possibly audio signals) can be exchanged or forwarded from one to the other.

In an embodiment, the hearing aid system comprises an auxiliary device, e.g. a remote control, a mobile phone a smartphone, or other portable or wearable electronic device, such as a smartwatch or the like.

In an embodiment, the auxiliary device is or comprises a remote control for controlling functionality and operation of the hearing aid. In an embodiment, the function of a remote control is implemented in a SmartPhone, the SmartPhone possibly running an APP allowing to control the functionality of the audio processing device via the SmartPhone (the hearing aid(s) comprising an appropriate wireless interface to the SmartPhone, e.g. based on Bluetooth or some other standardized or proprietary scheme).

In an embodiment, the auxiliary device is or comprises an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

In an embodiment, the auxiliary device is or comprises another hearing aid. In an embodiment, the hearing aid system comprises two hearing aids adapted to implement a binaural hearing system, e.g. a binaural hearing aid system.

Definitions:

In the present context, a hearing aid refers to a device, which is adapted to improve and/or augment hearing capability of a user by receiving acoustic signals from the user's surroundings, generating corresponding electric audio signals, possibly modifying the electric audio signals and providing the possibly modified electric audio signals as audible signals to at least one of the user's ears.

Such audible signals may e.g. be provided in the form of acoustic signals radiated into the user's outer ears, acoustic signals transferred as mechanical vibrations to the user's cochlea through the bone structure of the user's head and/or through parts of the middle ear as well as electric signals transferred directly or indirectly to the cochlear nerve of the user.

A general hearing aid housing may be configured to be worn in any known way, e.g. as a unit arranged behind the car with a tube leading radiated acoustic signals into the car canal or with an output transducer, e.g. a loudspeaker, arranged close to or in the car canal, as a unit entirely or partly arranged in the pinna and/or in the car canal, as a unit, e.g. a vibrator, attached to a fixture implanted into the skull bone, as an attachable, or entirely or partly implanted, unit, etc. The hearing aid may comprise a single unit or several units communicating electronically with each other.

More generally, a hearing aid comprises an input transducer for receiving an acoustic signal from a user's surroundings and providing a corresponding input audio signal and/or a receiver for electronically (i.e. wired or wirelessly) receiving an input audio signal, a (typically configurable) signal processing circuit (e.g. a signal processor, e.g. comprising a configurable (programmable) processor, e.g. a digital signal processor) for processing the input audio signal and an output unit for providing an audible signal to the user in dependence on the processed audio signal. The signal processor may be adapted to process the input signal in the time domain or in a number of frequency bands. In some hearing aids, an amplifier and/or compressor may constitute the signal processing circuit. The signal processing circuit typically comprises one or more (integrated or separate) memory elements for executing programs and/or for storing parameters used (or potentially used) in the processing and/or for storing information relevant for the function of the hearing aid and/or for storing information (e.g. processed information, e.g. provided by the signal processing circuit), e.g. for use in connection with an interface to a user and/or an interface to a programming device. In some hearing aids, the output unit may comprise transducer, such as e.g. a vibrator for providing a structure-borne or liquid-borne acoustic signal. In some hearing aids, the output unit may comprise one or more output electrodes for providing electric signals (e.g. a multi-electrode array for electrically stimulating the cochlear nerve).

In some hearing aids, the vibrator may be adapted to provide a structure-borne acoustic signal transcutaneously or percutaneously to the skull bone. In some hearing aids, the vibrator may be implanted in the middle car and/or in the inner car. In some hearing aids, the vibrator may be adapted to provide a structure-borne acoustic signal to a middle-car bone and/or to the cochlea. In some hearing aids, the vibrator may be adapted to provide a liquid-borne acoustic signal to the cochlear liquid, e.g. through the oval window. In some hearing aids, the output electrodes may be implanted in the cochlea or on the inside of the skull bone and may be adapted to provide the electric signals to the hair cells of the cochlea, to one or more hearing nerves, to the auditory brainstem, to the auditory midbrain, to the auditory cortex and/or to other parts of the cerebral cortex.

A hearing aid may be adapted to a particular user's needs, e.g. a hearing impairment. A configurable signal processing circuit of the hearing device may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing aid via an interface to a programming device (fitting system), and used by a processing algorithm executed by the configurable signal processing circuit of the hearing device.

A 'hearing system' refers to a system comprising one or two hearing aids, and a 'binaural hearing aid system' refers to a system comprising two hearing aids and being adapted to cooperatively provide audible signals to both of the user's ears. Hearing aid systems or binaural hearing aid systems may further comprise one or more 'auxiliary devices', which communicate with the hearing aid(s) and affect and/or benefit from the function of the hearing aid(s). Auxiliary devices may be e.g. remote controls, audio gateway devices, mobile phones (e.g. SmartPhones), or music players. Hearing aid, hearing aids systems or binaural hearing aid systems may e.g. be used for compensating for a hearing-impaired person's loss of hearing capability and/or augmenting a normal-hearing person's hearing capability and/or conveying electronic audio signals to a person. Hearing aids or hearing aid systems may e.g. form part of or interact with public-address systems, active ear protection systems, handsfree telephone systems, car audio systems, entertainment (e.g. karaoke) systems, teleconferencing systems, classroom amplification systems, etc.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Figure 1:
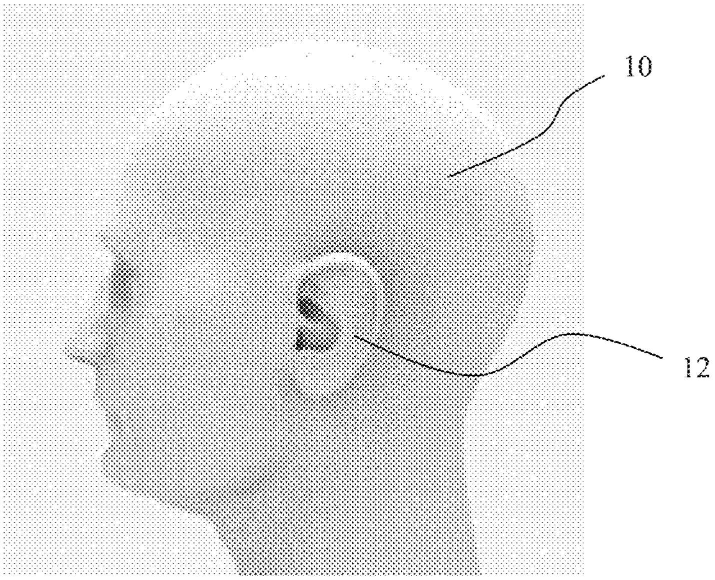
FIG. 1 shows a profile of a person's head.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening elements may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

FIG. 1 shows a profile of a person's head 10 having an ear 12. The head 10 comprises a skull bone that is covered by skin. The skull bone may establish communication of sound by mechanical vibrations to the person's cochlea nerve, wherein the mechanical vibrations are translated into movement of hair cells, which movements in turn are perceived as sound by the user.

Figure 2:
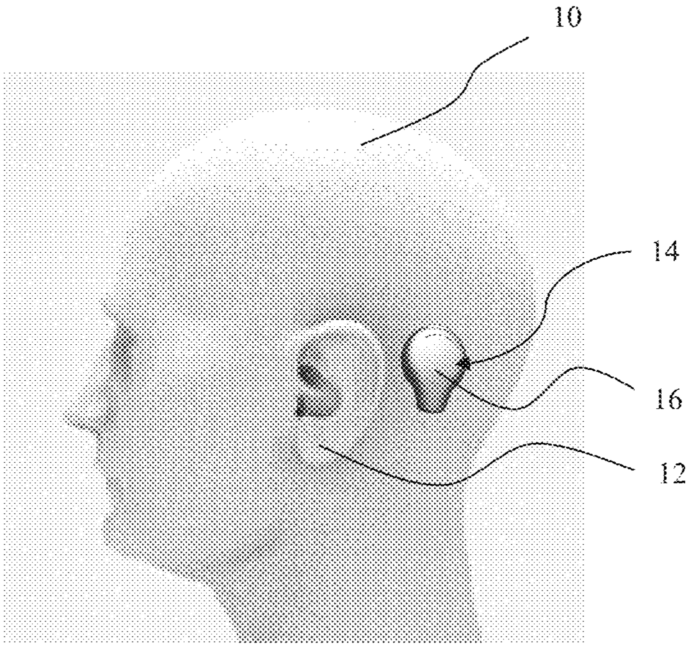
FIG. 2 shows a profile of a person's head carrying a hearing aid according to an embodiment of disclosure.

FIG. 2 shows a profile of a person's head 10 having an ear 12 and a first part 14 of a hearing aid according to the presently preferred embodiment of this disclosure. The first part 14 includes housing 16, which comprises an insert element having a first magnet engaging with a second part implanted beneath the skin of the head 10 and causing the first part 14 to attach to the head 10.

Figure 3A:
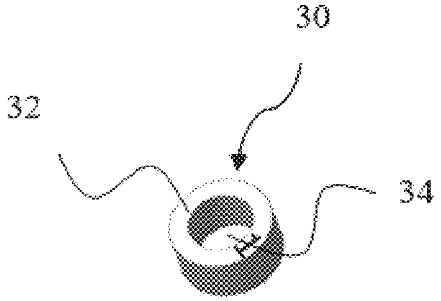
FIG. 3*a* and FIG. 3*b* show a first configuration of insert elements according to an embodiment of disclosure.

FIG. 3*a* shows an insert element 30 according to an embodiment of disclosure comprising a first magnet 32, and a non-magnetic space 34. The overall size of the insert element is fixed whereas the relation in size between the first magnet 32 and non-magnetic space 34 may vary. Hence by increasing the first magnet 32 size and simultaneously reducing the non-magnetic space 34 size, the magnetic strength of the insert element 30 may be varied so as to provide the magnetic strength of the insert element 30, which is suitable for a particular user's head.

In one embodiment the non-magnetic space 34 may as shown be defined by an opening in the insert element 30, which may have any shape but here in FIG. 3*a* is shown as a circular cylinder shape. Thus be increasing diameter of the circular cylinder shape of the non-magnetic space 34 and thus simultaneously decreasing size of first magnet 32, the magnetic strength is reduced. Contrarily, by decreasing diameter of the circular cylinder shape of the non-magnetic space 34 and thus simultaneously increasing size of first magnet 32, the magnet strength is increase.

Figure 3B:
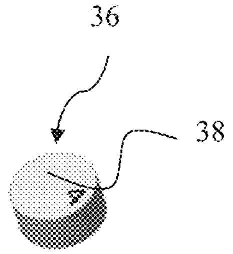

For example, as shown in FIG. 3*b* another insert element 36 the first magnet 38 takes up all the available space in the insert element 36 thus providing the maximum magnetic strength obtainable with selection of one specific magnetic material such as Neodynium.

Figures 4A, 4B, 4C, 4D, 4E:
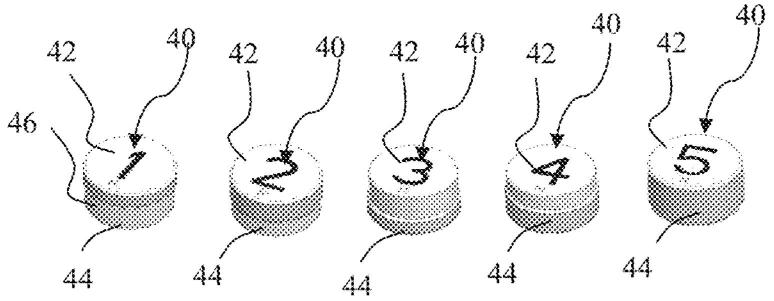
FIG. 4*a*, FIG. 4*b*, FIG. 4*c*, FIG. 4*d* and FIG. 4*e* show a second configuration of insert elements according to another embodiment of disclosure.

In another embodiment of the insert element 40, shown in FIG. 4*a*, the overall size of the insert element 40 is again fixed so as to match an inner recess 52 in the first part 14 of the hearing aid. The insert element 40 defines an overall cylindrical shape having a longitudinal length. However, in this case the magnetic strength of the insert element 40 is defined by a first magnet 42 extending part of the longitudinal length of the insert element 40 and by a non-magnetic space 44 extending the rest of the longitudinal length of the insert element 40. In FIG. 4*a* the non-magnetic space 44 is shown as a being encapsulated by a casing 46. This casing 46 may comprise any non-magnetic material such as air, plastic, cobber, aluminum, platinum or wood, or any material having a relative permeability of approximately one.

FIGS. 4*b*, 4*c*, 4*d* and 4*c* show variations of the embodiment of the insert element 40 wherein longitudinal length of the first magnet 42 and the non-magnetic space 44 is varied so as to achieve a variety of magnetic strengths of the insert element 40. This variation enables to adjust the magnet strength of the insert element 40 so as provide an optimal attachment of the first part 14 of the hearing aid to the head 10.

Figure 5:
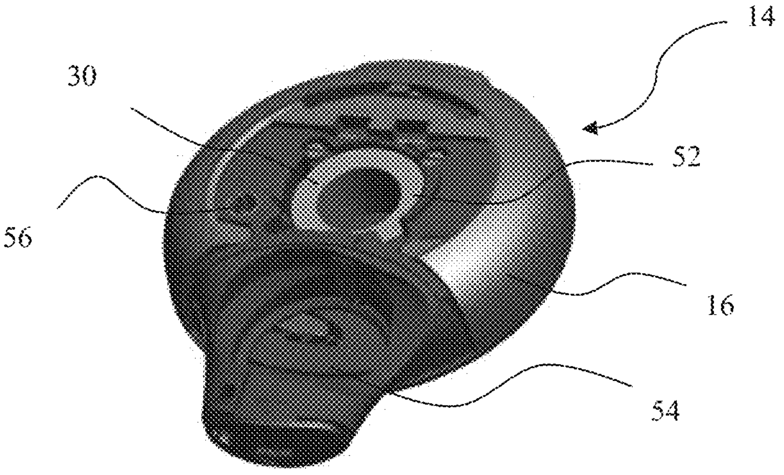
FIG. 5 shows a first view of first part of hearing aid in without cover system according to an embodiment of disclosure.

FIG. 5 shows a view of an embodiment of the first part 14 of the hearing aid. The first part 14, comprises a housing 16 for encapsulating input transducers, sound processor, output transducer and battery. Further, the first part 14 comprises an inner recess 52 adapted to receive the insert element 30, 36, 40. In FIG. 5, insert element 30 is shown located in the inner recess 52. Further, the first part 14 comprises a battery receiving area 54, wherein the battery is inserted before operating the hearing aid. Further, the first part 14 comprises a programming interface 56 adapted to receive a programming cable allowing for programming of the hearing aid to any desired specifications and in general providing an output signal for the hearing aid, which compensates for a user's hearing impairment.

The output transducer (not shown in FIG. 5) comprises a transmitter coil more or less following inner side of the circumference of the housing 16. The transmitter coil communicates a transmission signal to a receiving coil 112 of a second part 110 of the hearing aid (shown in FIG. 11). In the second part 110 the transmission signal received from the first part 14 in the transmission coil 112 is converted into mechanical vibrations by a vibrator 114, fixated to the skull bone of the user by means of a set of bone engaging screws 116, 118 tightening a beam 120 against the second part 110 towards the skull bone of the user, preferably towards to the temporal bone, and more preferably towards the mastoid part of the temporal bone.

Figure 6:
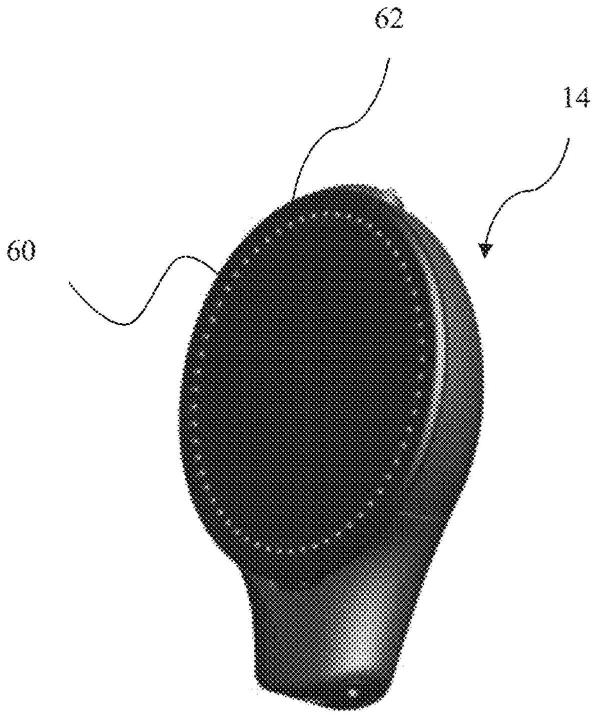
FIG. 6 shows skin-engaging surface of first part of hearing aid according an embodiment of disclosure.

In an embodiment the first part 14 comprises a skin engaging surface 60, shown in FIG. 6. The skin engaging surface 60 comprises a series of friction elements 62, which may be constituted by a series of protrusion from the skin engaging surface 60. These friction elements 62 increase friction between the skin of the user's head 10 and the first part 14 thus allowing for a reduction of magnetic strength of the insert element 30, 36, 40 causing the weight of the insert element 30, 36, 40 to become less. This advantageously enables the provision of a better design of the first part 14, as the reduction of weight of the first part 14 provide the possibility for reducing the overall size of the first part 14. From a designing point of view this is particularly interesting since the size of a hearing aid is important to the user.

The friction elements 62 shown in FIG. 6 to be located along the periphery of the skin engaging surface 60. Other configurations are contemplated as for example, concentric circles of friction elements, or series of friction elements 62 radiating outwardly along the skin engaging surface 60.

Figure 7:
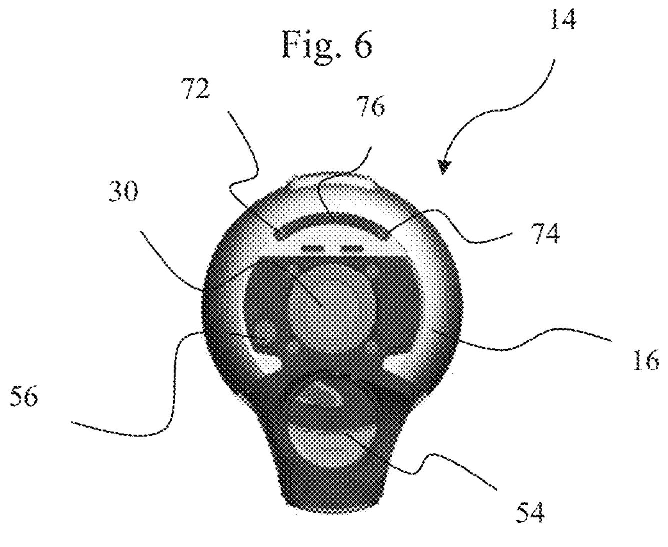
FIG. 7 shows a second view of first part of hearing aid without cover system according to an embodiment of disclosure.

FIG. 7 shows a top view of a first part 14 of a hearing aid without cover system. The first part 14 comprises as also indicated in description with reference to FIG. 5 a housing 16, an insert element 30 placed in inner recess 52, a programming interface 56, a battery draw 54, a first and second microphone inlet 72 and 74 as well as a light diode 76.

Figure 8:
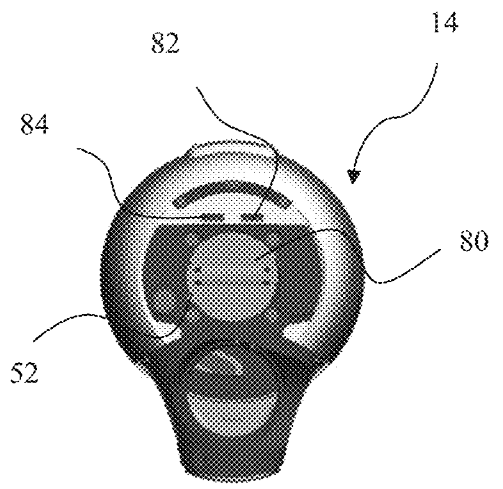
FIG. 8 shows a third view of first part of hearing aid without cover system but with lid according to an embodiment of disclosure.

FIG. 8 shows in addition to elements of FIG. 7 a lid 80, which engages with the upper level of the inner recess 52 to lock the inner element 30, 36, 40 into the inner recess 52. This may be achieved by a twisting or rotating action of the lid 80.

Figure 9:
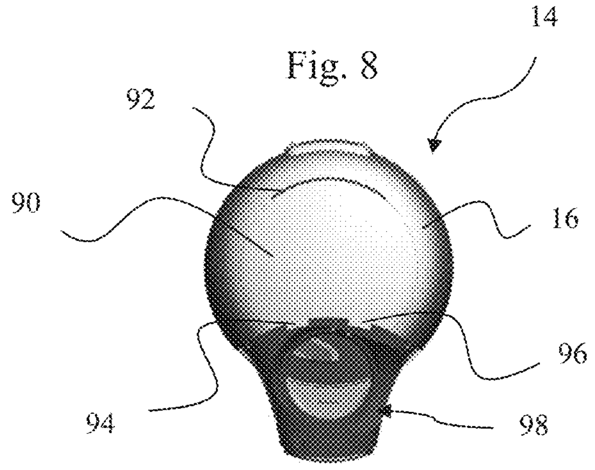
FIG. 9 shows a fourth view of first part of hearing aid showing one part of cover system according to an embodiment of disclosure.

FIG. 9 shows in addition to the elements of FIGS. 7 and 8 a decoration cover 90 engaging with the first part 14 through engagement holes 82, 84 (shown in FIG. 8). The decoration cover 90 provides for a slit 92 between the housing 16 and the decoration cover 90 providing ambient sound access to the microphone inlets 72, 74 and visibility of the light diode 76 from the outside. For example, the light diode may indicate "on" and coloring further battery status.

Figure 10:
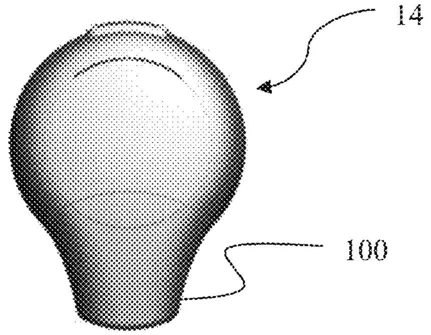
FIG. 10 shows a fifth view of first part of hearing aid showing cover system according to an embodiment of disclosure.

FIG. 10 shows in addition to the elements of FIGS. 7, 8 and 9 batter cover 100 engaging with decoration cover 90 through prongs 94 and 96. The battery cover 100 encloses the battery compartment 54 as well as the inner sections of the first part 14. The battery cover 100 may be shaped to fit over the entire battery section 98 of the first part 14. Hence the battery cover 100 is pushed over the battery section 98 and comprises to openings exactly engaging with prongs 94 and 96. The battery section may be secured by snapping or locking means thus fixating decoration and batter covers 90, 100. The decoration and battery covers 90, 100 may be construed as a cover system.

Figure 11:
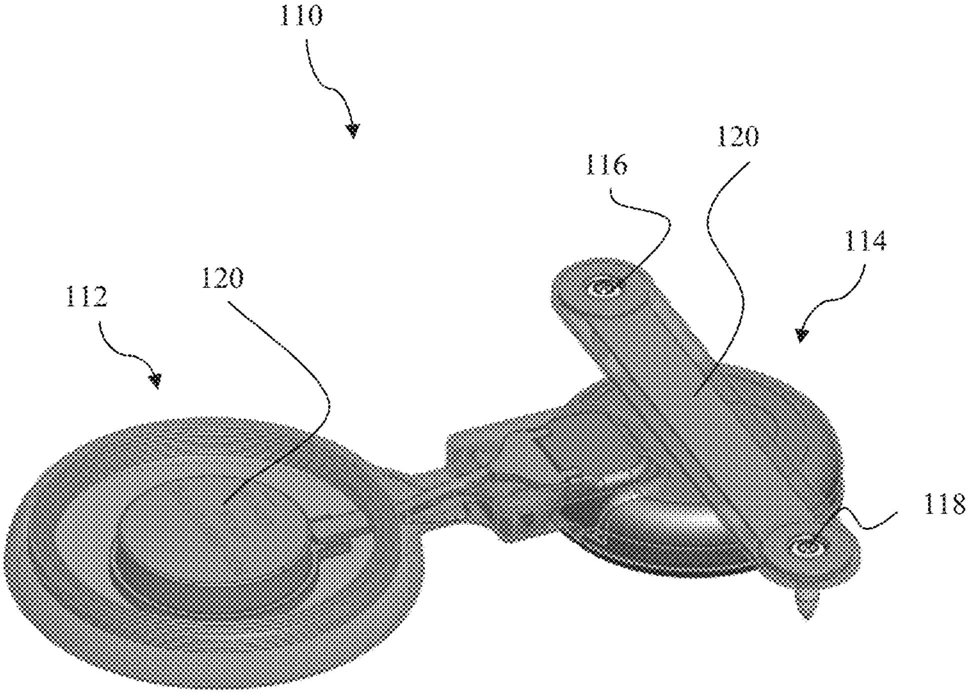
FIG. 11 shows a view of second part of hearing aid according to an embodiment of disclosure.

FIG. 11 shows the second part 110 of the hearing aid. The second part 110 comprises a reception coil 112 for receiving transmission signal from first part 14. The transmission signal is converted into an output signal, which may be provided by the vibrator 114, shown in FIG. 11, or by a cochlea implant driver.

The second part 110 may further comprise a second magnet 120, which similarly as the insert element 30, 36, 40 may be configured as having a variety of magnetic strengths. The second magnet 120 cooperates with the first magnet 32, 42 of the insert element 30, 36, 40 in the first part 14.

The second part 110 may further comprise a second processor enabling additional signal processing to be performed before the received transmission signal is converted to the output signal.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

The invention claimed is:

1. A bone-anchored hearing aid for placement on head of a user, the bone-anchored hearing aid comprising:
- an external transmitter configured to be located on an outer surface of the head of the user, the external transmitter comprising:
  - at least one microphone configured to obtain ambient sound and convert the ambient sound to an electric signal,
  - a signal processor configured to process the electric signal for provision of a transmission signal,
  - a transmission coil configured to inductively communicate the transmission signal,
  - a skin engaging surface configured to apply friction to the head of the user, and
  - a first magnet;
- an internal receiver configured for implantation in the head of the user, the internal receiver comprising:
  - a reception coil configured to inductively receive the transmission signal and to convert the transmission signal to an output signal;
  - a vibrator configured to output the output signal as a vibration which can be perceived as sound by the user; and
- a second magnet configured to apply an attractive force to the first magnet, wherein the skin engaging surface comprises a series of protrusions.

2. The bone-anchored hearing aid of claim 1, wherein the external transmitter further comprises an antenna configured to receive and transmit wireless signals to an external device.

3. The bone-anchored hearing aid of claim 1, wherein the internal receiver is configured for percutaneous transplanting.

4. The bone-anchored hearing aid of claim 1, wherein the internal receiver is configured for transcutaneous transplanting.

5. The bone-anchored hearing aid of claim 1, wherein the series of protrusions comprises a circle of protrusions.

6. The bone-anchored hearing aid of claim 1, wherein the internal receiver further comprises a beam extending across a portion of the internal receiver, wherein the beam comprises a first end and a second end, wherein the first end and the second end are configured to be tightened to the head of the user.

7. The bone-anchored hearing aid of claim 1, wherein the internal receiver comprises a first housing and second housing, wherein the first housing is connected to the second housing via a flexible component.

8. The bone-anchored hearing aid of claim 1, wherein the internal receiver comprises a casing having a magnetic or paramagnetic material.

9. The bone-anchored hearing aid of claim 1, wherein the first magnet is neodymium.

10. The bone-anchored hearing aid of claim 1, wherein the first magnet is configured to be inserted into a recess in the external transmitter.

11. The bone-anchored hearing aid of claim 1, wherein the reception coil laterally surrounds the second magnet.

12. A bone-anchored hearing aid for placement on head of a user, the bone-anchored hearing aid comprising:
- an external configured to be located on an outer surface of the head of the user, the external transmitter comprising:
  - at least one microphone configured to obtain ambient sound and convert the ambient sound to an electric signal,
  - a signal processor configured to process the electric signal for provision of a transmission signal,
  - a transmission coil configured to inductively communicate the transmission signal,
  - a skin engaging surface configured to apply friction to the head of the user, and
  - first magnet;
- a internal receiver configured for implantation in the head of the user, the internal receiver comprising:
  - a reception coil configured to inductively receive the transmission signal and to convert the transmission signal to an output signal;
  - a vibrator configured to output the output signal as a vibration which can be perceived as sound by the user, and
- a second magnet configured to apply an attractive force to the first magnet,
- wherein said external transmitter further comprises a housing and a cover system, wherein the cover system comprises a first section configured to cover the first magnet, and a second section configured to cover a battery located in the housing, wherein the first and second sections lock on to the housing and with one another, and wherein the second section is secured by a snapping mechanism.

13. The bone-anchored hearing aid of claim 12, wherein said second section is shaped to fit over the entire battery.

14. The bone-anchored hearing aid of claim 12, wherein said first section comprises at least two prongs, and said second section is configured to engage with said prongs.

* * * * *